No. 743,274. PATENTED NOV. 3, 1903.
H. HALSEY.
ELECTRIC BATTERY.
APPLICATION FILED JUNE 23, 1903.
NO MODEL.
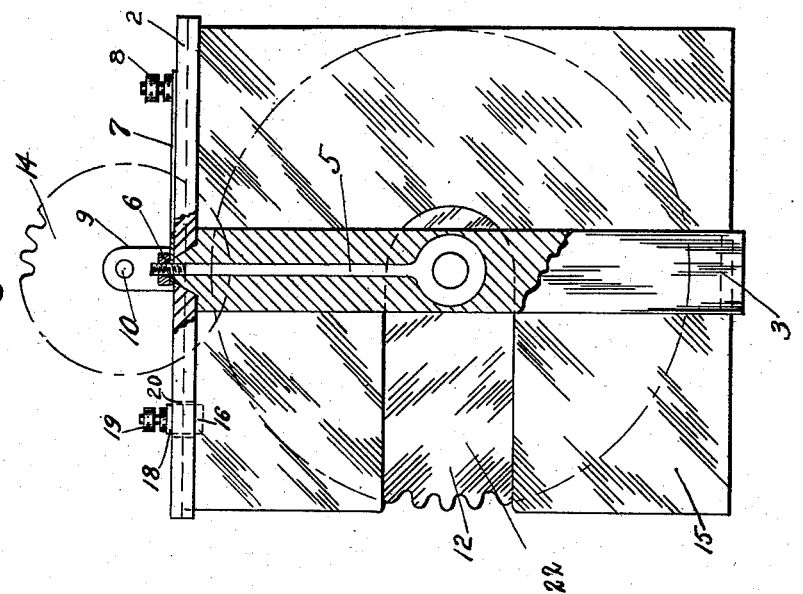
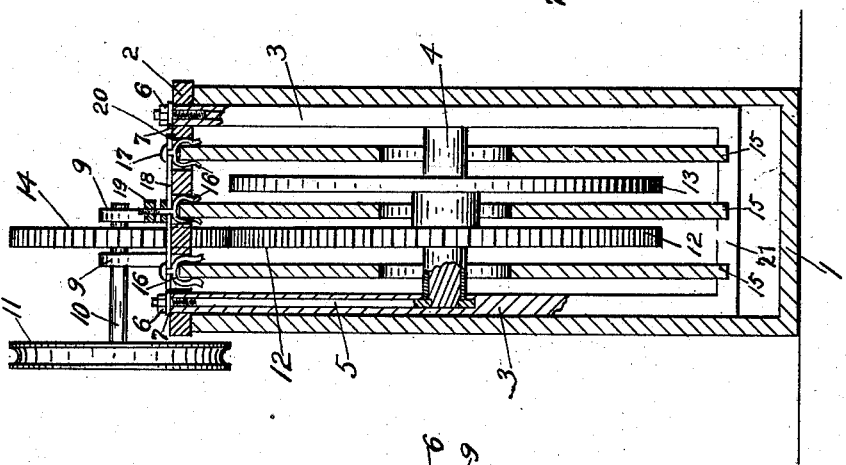
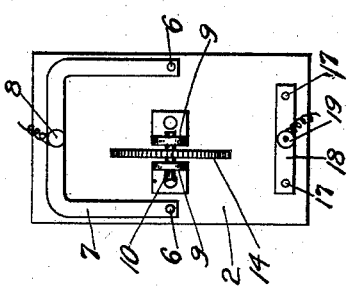
Witnesses
Henry Halsey, Inventor
By his Attorney No. 743,274. Patented November 3, 1903.

UNITED STATES PATENT OFFICE.

HENRY HALSEY, OF NEW YORK, N. Y., ASSIGNOR TO HALSEY ELECTRIC GENERATOR COMPANY, A CORPORATION OF NEW JERSEY.

ELECTRIC BATTERY.

SPECIFICATION forming part of Letters Patent No. 743,274, dated November 3, 1903.

Application filed June 23, 1903. Serial No. 162,695. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to improvements in the construction of electric batteries, and has especial reference to the type employing a movable electrode.

The object of the invention is to provide a battery having a minimum number of parts, an increased efficiency, and which shall be adapted to be readily assembled and taken apart.

In the present battery I support the stationary electrodes upon the cover, thereby dispensing with the framework heretofore arranged within the battery-casing to support such electrodes. I also provide for the convenient removal of such electrodes without dismantling the battery or disarranging the mechanism for imparting motion to the movable electrode of the battery.

The invention will be more particularly described with reference to the accompanying drawings, in which—

Figure 1 represents a cross-section of a battery embodying my improvements. Fig. 2 is a side view of a cover carrying the electrodes, and Fig. 3 is a reduced plan view.

1 represents a casing or receptacle adapted to contain an electrolyte and having a cover 2 fitting thereon. Attached to the under side of the cover 2 are hangers 3, connected across the bottom by a bridge-piece 21. The hangers are dovetailed into the top of the cover, so as to make a rigid joint, and are made of insulating material not affected by the electrolyte. Embedded in the hangers are eye-bars 5, of conducting material, threaded at their upper ends and carrying nuts 6, which serve to fasten the hangers to the cover. The bars 5 carry at their lower ends a shaft 4, upon which is mounted the negative electrode 13. The negative electrode is composed of one or more disks connected by a hub and electrically connected with the shaft 4. Except where it contacts with the eyebars 5 the shaft 4 is covered with insulation and is of conducting material. One of the disks 13 carries a gear 12, which meshes with a gear 14. The gear 14 is mounted on shaft 10 in bearings 9 on the cover. Pulley 11 or other suitable means is provided for driving the gear 14. Mounted over slots 20 in the cover 2 is a contact-bar 18, carrying spring-clips 16 and a binding-post 19. The spring-clips hold the plates 15, forming the positive electrode, in position at their upper ends and at the same time make contact through the bar 18 with the binding-post 19. The cover is grooved to correspond with the clips 16. The bridge 21 contains similar grooves, into which the plates fit, and as each plate is provided with a cut-out portion 22, which clears shaft 4, the plates may be slid into and out of their respective positions. The conducting-bars 5 lead to a U-shaped plate 7, which carries a binding-post 8.

It will be seen that by the foregoing construction the battery is simplified and that the positive electrode can be easily removed without dismantling the battery or disarranging the gearing by which the movable electrode is rotated. When the battery is not in use, the cover will be removed, carrying with it the electrodes, and thus preventing waste.

Modifications and changes may be made without departing from the scope of the invention.

Having thus described my invention, I declare that what I claim as new, and desire to secure by Letters Patent, is—

1. In a battery, the combination with a casing, of a cover carrying hangers, and movable and fixed electrodes supported by said hangers, substantially as described.

2. In a battery, the combination with a casing, of a cover carrying hangers, electrodes supported by said hangers, and electrical conductors embedded in said hangers, and contacting with the electrodes, substantially as described.

3. In a battery, a cover carrying hangers, a movable electrode supported in said hangers, a bridge-piece connecting said hangers and an electrode supported by said bridge-piece, substantially as described.

4. In a battery, the combination of hangers adapted to carry a movable electrode, and a bridge-piece carried by said hangers and adapted to support a stationary electrode, substantially as described.

5. In a battery, the combination of a cover, a pair of hangers depending therefrom, a movable electrode supported by said hangers, said hangers being extended and connected by a bridge-piece, a stationary electrode supported between said bridge-piece and said cover, and a spring-contact electrically connecting said stationary electrode with a binding-post, substantially as described.

6. In a battery, the combination of a cover, a pair of hangers depending therefrom, a movable electrode supported by said hangers, said hangers being extended and connected by a bridge-piece, a stationary electrode supported between said bridge-piece and said cover, substantially as described.

7. In a battery, the combination of a cover, a pair of hangers depending therefrom, a movable electrode supported by said hangers, said hangers being extended and connected by a bridge-piece, a stationary electrode supported between said bridge-piece and said cover, and a spring-clip adapted to steady said electrode and convey current therefrom, substantially as described.

8. In a battery, the combination with a cover carrying a driving-gear, of hangers carrying a movable electrode, a conducting-bar in said hangers connected with said electrode, a bridge-piece connecting said hangers, an electrode supported on said bridge-piece, and a contact device therefor, substantially as described.

9. In a battery, the combination of a cover supporting both electrodes, and a bridge-piece also carried by said cover and coöperating therewith to support one of said electrodes, substantially as described.

10. In a battery, the combination with a series of electrodes, of a contact-bar carrying clips adapted to engage said electrodes, substantially as described.

11. In a battery, the combination of a series of electrodes, a cover, and a contact-bar carried by said cover and carrying clips adapted to engage the several electrodes, substantially as described.

12. In a battery, the combination of a cover, a movable electrode and a stationary electrode carried thereby, and means whereby said stationary electrode may be removed without disturbing the movable electrode, substantially as described.

13. In a battery, the combination of a cover, a shaft carrying a movable element and having bearings supported upon said cover, and a stationary element also carried by said cover and adapted to be moved into and out of its normal position without disturbing said movable element, substantially as described.

14. In a battery, the combination with the casing, of a cover, a pair of hangers carried thereby, said hangers having bearings adapted to support a movable electrode and supports adapted to receive a stationary electrode, substantially as described.

15. In a battery, a cover, a frame supported thereby, plates supported in said frame and contact-springs on said cover adapted to connect and retain the plates, substantially as described.

16. In a battery, the combination with a cover, of a movable electrode attached thereto, and a fixed electrode also attached to the cover and having a cut-out portion adapted to clear the bearing of the movable electrode, substantially as described.

17. In a battery, the combination of a cover carrying a spring-contact clip, and an electrode adapted to be engaged thereby, substantially as described.

18. In a battery, the combination of a frame, a movable electrode mounted upon a shaft having bearings independent of said frame, and a stationary electrode adapted to be supported in said frame and having a cut-away portion adapted to clear said shaft, substantially as described.

19. In a battery, the combination with a top carrying a depending movable element, of a fixed element comprising one or more plates, each plate being cut out from one side toward the center, substantially as described.

In testimony whereof I affix my signature in presence of two witnesses.

HENRY HALSEY.

Witnesses:
ANTHONY J. ERNEST,
GEORGE N. KERR.